United States Patent
Bauer

(10) Patent No.: US 7,278,810 B2
(45) Date of Patent: Oct. 9, 2007

(54) GROMMET

(75) Inventor: Christian Bauer, Karlsfeld (DE)

(73) Assignee: ITW Automotive Products GmbH & Co. KG, Iserlohn (DE)

( * ) Notice: Subject to any disclaimer, the term of this patent is extended or adjusted under 35 U.S.C. 154(b) by 0 days.

(21) Appl. No.: 10/767,743

(22) Filed: Jan. 30, 2004

(65) Prior Publication Data

US 2004/0191025 A1    Sep. 30, 2004

(30) Foreign Application Priority Data

Feb. 15, 2003   (DE) ............................... 103 06 538

(51) Int. Cl.
F16B 19/00 (2006.01)
F16B 21/00 (2006.01)

(52) U.S. Cl. .................. 411/508; 411/553; 411/549; 411/36

(58) Field of Classification Search ............... 411/508, 411/549, 553

See application file for complete search history.

(56) References Cited

U.S. PATENT DOCUMENTS

| | | | | |
|---|---|---|---|---|
| 3,444,917 A | * | 5/1969 | Bennett | 411/176 |
| 3,701,373 A | * | 10/1972 | Wronke et al. | 411/182 |
| 3,756,116 A | * | 9/1973 | Schuplin | 411/15 |
| 4,077,300 A | * | 3/1978 | Yoda | 411/15 |
| 4,293,260 A | * | 10/1981 | Kojima et al. | 411/44 |
| 4,648,766 A | * | 3/1987 | Wollar | 411/41 |
| 4,704,059 A | * | 11/1987 | Nakama et al. | 411/182 |
| 4,906,152 A | * | 3/1990 | Kurihara | 411/182 |
| 4,927,306 A | * | 5/1990 | Sato | 411/182 |
| 4,981,310 A | * | 1/1991 | Belisaire | 285/140.1 |
| 5,222,852 A | * | 6/1993 | Snyder | 411/553 |
| 5,269,640 A | * | 12/1993 | Jonishi et al. | 411/55 |
| 5,294,225 A | * | 3/1994 | Kazino et al. | 411/182 |
| 5,322,402 A | * | 6/1994 | Inoue | 411/510 |
| 5,448,809 A | * | 9/1995 | Kraus | 24/453 |
| 5,533,237 A | * | 7/1996 | Higgins | 24/289 |
| 5,540,528 A | * | 7/1996 | Schmidt et al. | 411/55 |
| 6,203,240 B1 | * | 3/2001 | Hironaka et al. | 403/397 |
| 6,244,805 B1 | * | 6/2001 | Everard | 411/182 |
| 6,443,678 B2 | * | 9/2002 | Mizuno et al. | 411/182 |
| 6,447,166 B1 | * | 9/2002 | Ray et al. | 384/10 |
| 6,560,819 B2 | * | 5/2003 | Mizuno et al. | 16/2.2 |
| 2002/0003993 A1 | * | 1/2002 | Ichimaru | 411/325 |
| 2003/0143054 A1 | * | 7/2003 | Kanie et al. | 411/175 |

FOREIGN PATENT DOCUMENTS

DE    78 03 988     9/1978
GB    1237063      6/1971

* cited by examiner

*Primary Examiner*—J. J. Swann
*Assistant Examiner*—David Reese
(74) *Attorney, Agent, or Firm*—Lowe, Hauptman, Ham & Berner, LLP

(57) ABSTRACT

A grommet for an opening of a sheet member includes a shank, a head and at least a flexible locking tab. The shank includes, in a region adjacent the head and outside the locking tab, a shoulder to be placed below an edge of the opening when the shank is rotated an angle about the axis of the opening after being inserted therein. The shoulder and the locking tab prevent withdrawal of the grommet from the opening. The shank further includes an inclined outer surface section connecting the shoulder and the lower surface of the head. The inclined outer surface section engages the edge of the opening and draws the shank into the opening upon rotation of the shank.

20 Claims, 4 Drawing Sheets

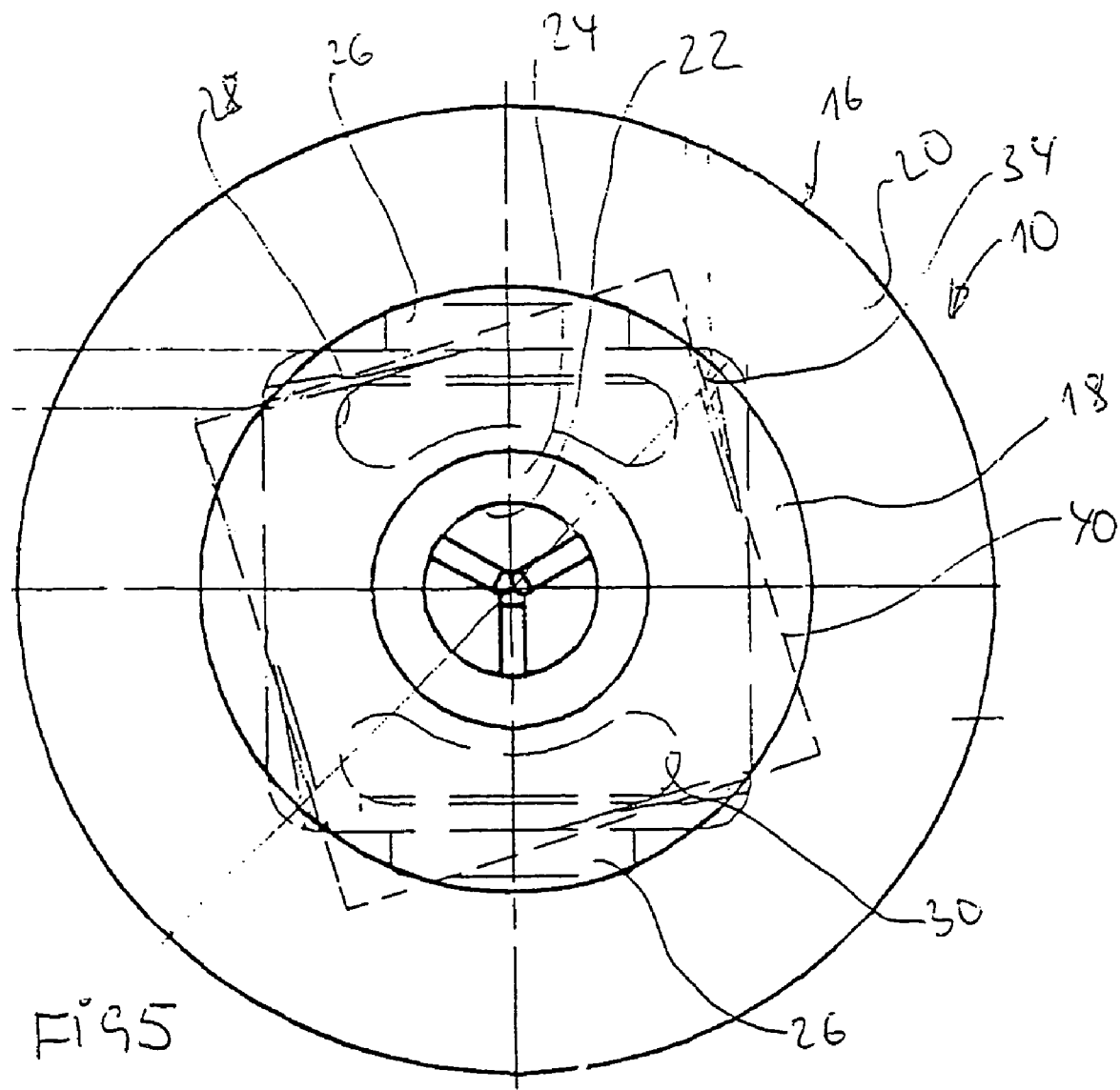

GROMMET

FIELD OF THE INVENTION

The invention relates to a grommet of plastic material.

BACKGROUND OF THE INVENTION

Expandable nuts or so-called grommets of a plastic material have become known in most varied designs. Commonly, they are snappingly inserted into the opening of a sheet-like support by means of a shank. The shank has snapping means to retain the grommet in the opening. Furthermore, the grommet has a flange-like head which sealingly comes to bear against the side of the support that faces it when the shank has been snappingly seated in the opening. The head frequently has a flange-shaped portion of another plastic material which is softer than that of the shank and has a better sealing effect. The shank has an inner axial receiving bore into which a member having a male thread can be screwed to fix another member to the support.

The receiving holes in the support member frequently are of a square shape. Accordingly, the shank is also of a square shape in cross-section. In this context, it has also become known to provide shoulders at the outside of the shank at least on diagonally opposed sides close to the head. The shank and the receiving opening are profiled and dimensioned so as to allow to rotate the shank about a certain angle. As a result, the surface of the shoulders gets under the support member on the side opposing the head so that it is no longer possible to draw the shank out of the opening. At this stage, the surface portions above the shoulders cooperate with the edge of the opening to clampingly retain the grommet in the rotated position in the receiving opening.

Naturally, the sheet of the support member is with tolerances. In addition, the support members are of different thicknesses which depend on their application. The distance between the shoulder and the underside of the head cannot be prevented from being larger than the thickness of the support member. This can cause the grommet, when under a load, to come loose from the support member. Besides, this endangers the water tightness, safe function, and freedom from rattling, which are required particularly for the manufacture of automobiles.

SUMMARY OF THE INVENTION

It is the object of the invention to improve an grommet of the aforementioned type with a view to producing an approximately equal distance or bias between the head of the grommet and the support member independently of the thickness of the sheet of the support member.

In the inventive grommet, the outer surface portion is inclined towards the longitudinal axis in the direction of the head that when the shank is rotated in the opening it is increasingly drawn into the opening.

In the inventive grommet, a snapping chamfer is provided above the shoulders which cooperates with the edge of the receiving opening when the grommet is rotated in the opening. This chamfer is conical, i.e. inclined towards the head from the axis, in the invention. In this manner, when the grommet is rotated a bias into the receiving opening is applied to the shank as soon as the edge of the opening gets into engagement with the detent chamfer. Whatever the sheet thickness is, this will ensure that the head gets into engagement with the support member side facing it under a bias and produces a sufficient sealing action. Moreover, this ensures that the grommet, when under a tensile load, does not come loose from sheets of lesser thicknesses. In the inventive grommet, sufficient tightness is provided, which is a safety from undesirable chattering and clearance, whatever the sheet metal thickness is.

The detent chamfers or outer surface portions can be of a cambered or any other shape. They are planar, according to an aspect of the invention.

The invention is particularly advantageous when a square-shaped opening and a shank of the grommet having an approximately square cross-section are used. However, the invention is not limited to such contour, but can also be used, for example, for an elliptic or oval receiving opening in the support member, and a shank complementary in cross-section.

In another aspect of the invention, the shoulders of the shank have their origin in a corner portion of the shank and extend towards an adjacent corner while they narrow continuously until they gradually run into the outer surface of the shank. The detent chamfer hereby starts preferably at the bottom of the shoulder and extends towards the head with the detent chamfer also ending with the respective shoulder in this aspect of the invention.

BRIEF DESCRIPTION OF THE DRAWINGS

The invention will be described in more detail below with reference to an embodiment shown in the drawings.

FIG. 5 shows the same representation of the grommet of FIG. 4, but with a contour drawn in for a receiving opening in a sheet-like support.

DETAILED DESCRIPTION OF THE PREFERRED EMBODIMENTS

Figure 1:
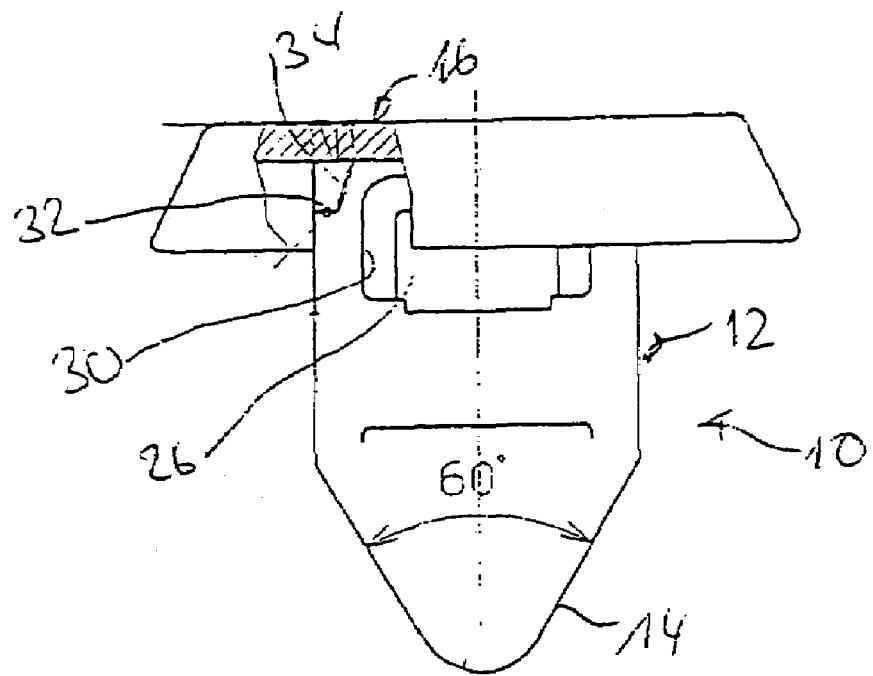
FIG. 1 shows a side view of a grommet according to the invention, partially in a section.

A grommet 10 of FIGS. 1 to 5 has a shank 12 which exhibits a conical insertion end 14 for the placement in a receiving opening of a sheet-like support member, reference to which will be made farther below.

A head 16 is formed with the shank 12 at the end opposing the insertion end 14. The head 16 is comprised of a radially inner portion 18 which is made of the same material as is the shank 12, and a radially outer portion 20 which is formed from a softer, elastomeric material. The grommet 10 is formed by a two-component injection moulding technique which is known per sé.

Figure 4:
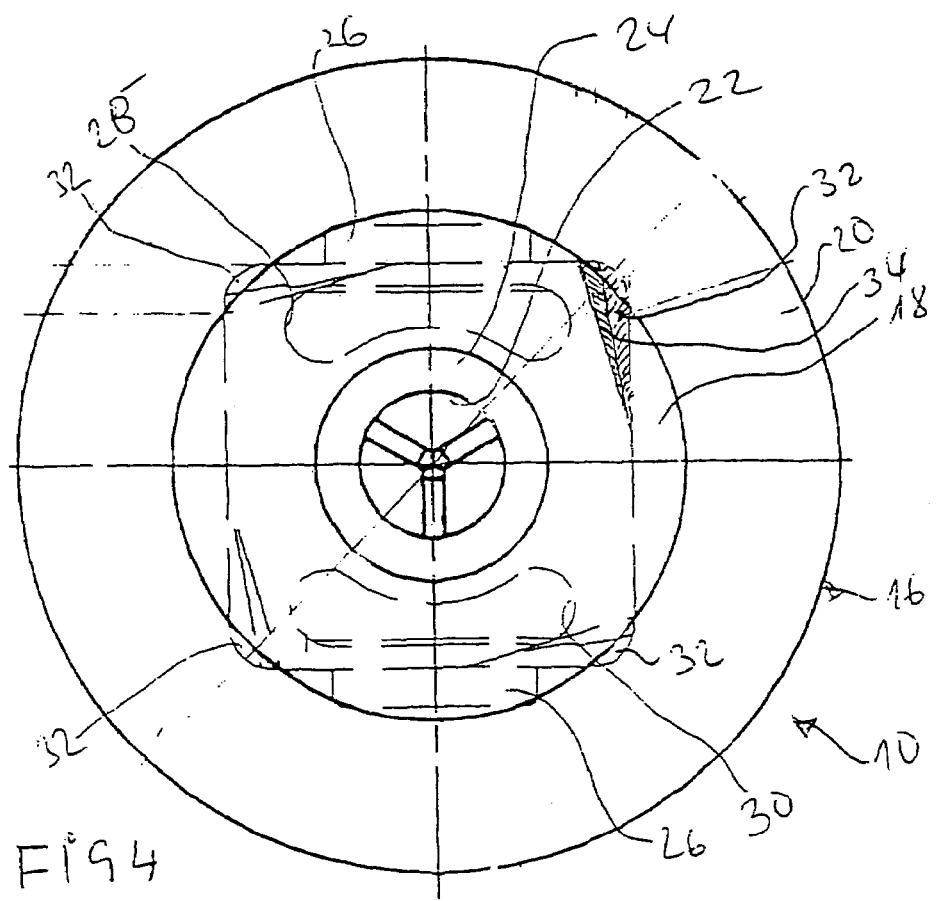
FIG. 4 shows a plan view of the grommet of FIG. 1 at an enlarged scale.

The outer contour of the shank 12 is square in cross-section as is evident from FIGS. 4 and 5. The shank 12 internally has an axial receiving bore 22 which also extends through the portion 18 of the head 16. A conical inserting portion 24 is formed in the area of the head portion 18. The receiving bore 22 serves for the reception of a member having a threaded portion which can be screwed into the bore 22 to fix another member.

Figure 2:
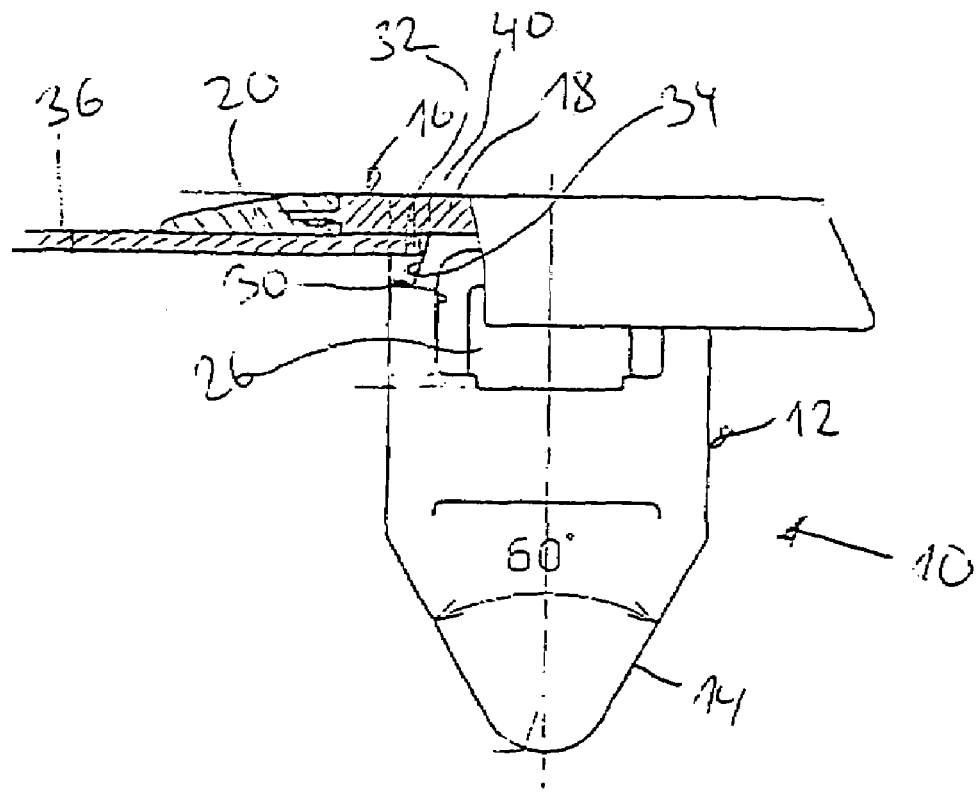
FIG. 2 shows the grommet of FIG. 1 in a receiving opening of a sheet-like support member of a small thickness.
Figure 3:
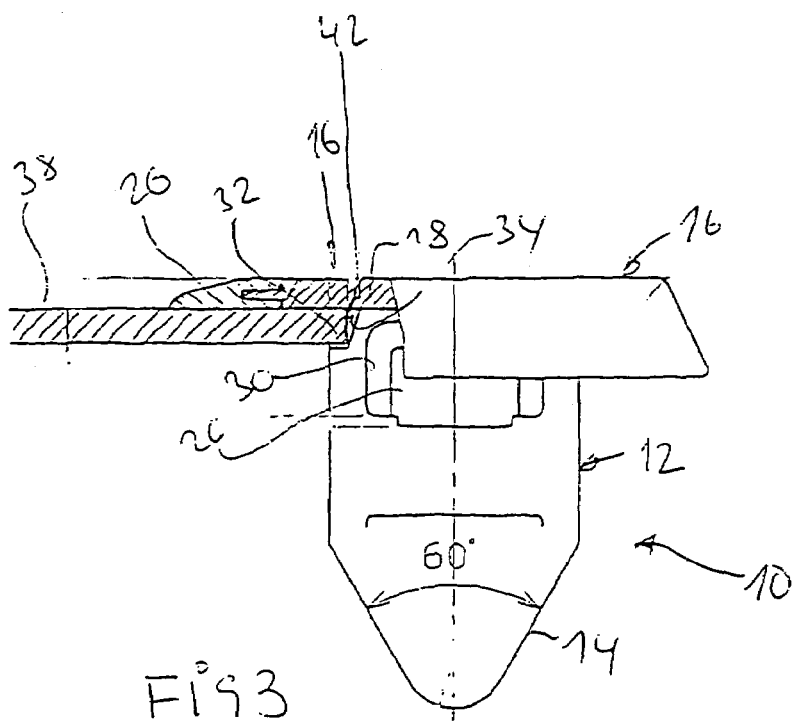
FIG. 3 shows the grommet of FIG. 1 in a receiving opening of a sheet-like support member of a larger thickness.

Snapping lugs 26 are formed on two opposed sides of the shank 12 close to the head 16. In the area of the snapping lugs 26, the shank presents axially parallel through slots 28, 30 whereby the snapping lugs 26 are formed on a yielding wall portion. Besides, as can be seen in FIGS. 1 to 3, the snapping lugs 26 are kept free by a U-shaped slot 30. Therefore, they can be radially deformed inwardly while being inserted into a receiving opening and, subsequently, snap back behind the edge of the receiving opening when the grommet 10 is introduced into the receiving opening as can be appreciated in FIGS. 2 and 3.

Near the head 16, in all of the four corner portions, the shank 12 has shoulders 32 the surfaces of which extend to be approximately perpendicular to the axis of the shaft 12 and which start in the associated corner and extend towards an adjacent corner each as can be seen from FIGS. 4 and 5. Their width is increasingly reduced thereby so that the shoulder surfaces 32 are of approximately triangular shapes.

The head 16 and the shoulders 32 have formed therebetween a surface portion 34 each which is inclined from the longitudinal axis of the shank 12 towards the head 16 as is apparent from FIGS. 1 to 3. Each surface portion 34 extends upwards from the shoulder 32 and is of approximately the same width as this one as is obvious again from FIGS. 4 and 5. The surface 34 is not only inclined upwardly with respect to the longitudinal axis of the shank 12, but also extends at an angle from the side edges of the square which is defined by the cross-section of the shank 12. This can also be seen well from FIGS. 4 and 5.

Figure 4A:
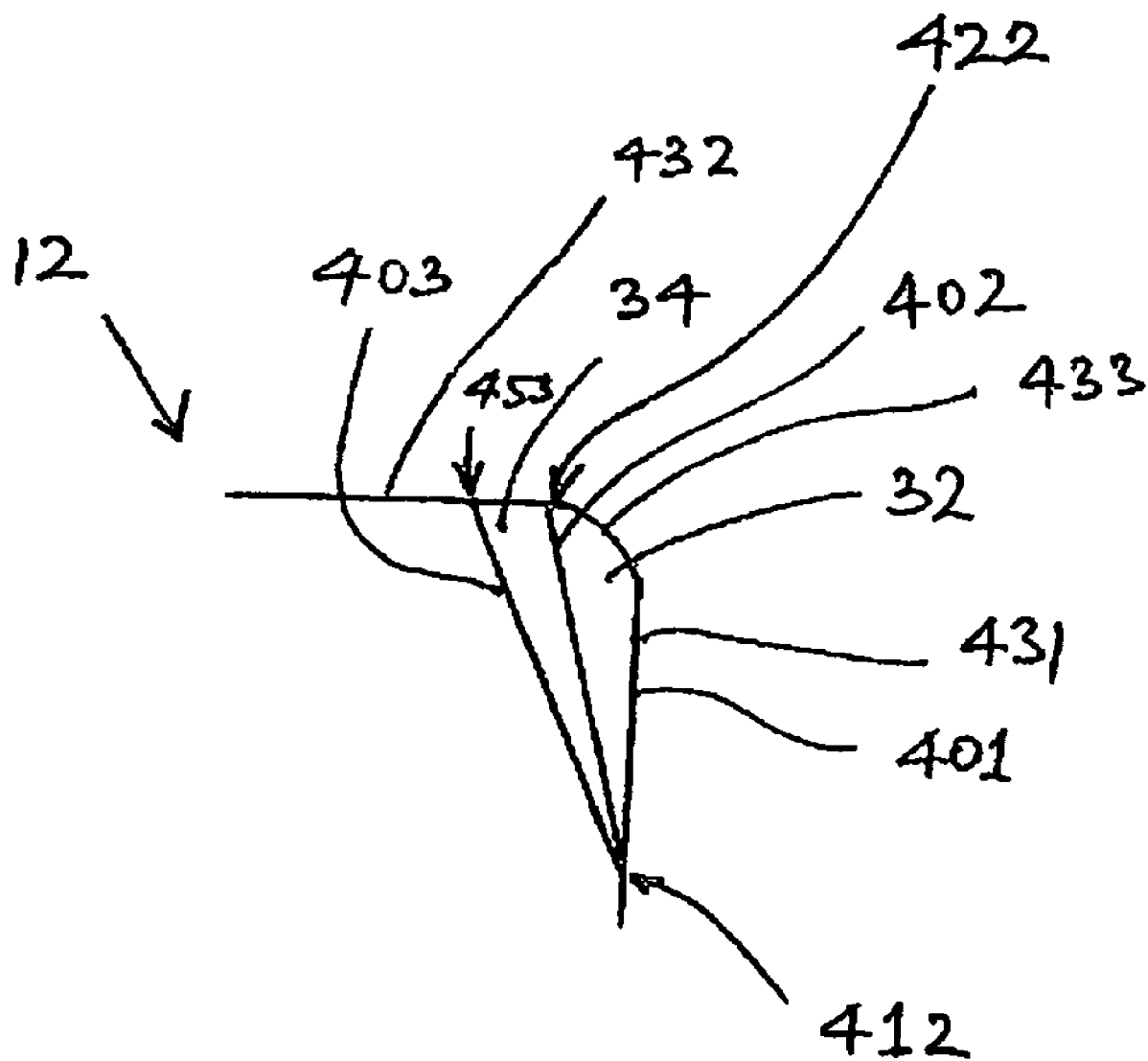
FIG. 4A is an enlarged, partial view of FIG. 4.

As best seen in FIG. 4A which is a partial top plan view of shank 12, when shank 12 is seen in the axial direction thereof, shoulder 32 is confined between an outer edge 401 of shank 12 and a first boundary line 402. First boundary line 402 intersects first and second sections 431, 432 of outer edge 401 of shank 12 at first and second points 412, 422. Outer edge 401 of shank 12 further includes a corner section 433 located between and connecting first and second sections 431, 432. Further, surface portion 34 is confined between first boundary line 402 and a second boundary line 403. Second boundary line 403 converges toward one, i.e., 412, of the intersections 412, 422 of outer edge 401 and first boundary line 402. Second boundary line 403 intersects second section 432 of outer edge 401 of shank 12 at third point 453. Third point 453 is farther from corner section 433 than second point 422.

FIGS. 2 and 3 illustrate a support member 36, 38 of different thicknesses which has a receiving opening each 40 and 42 which have the same dimensions. It can be appreciated from FIG. 3 that the support member 36 nearly fills the space between the shoulder 32 and the underside of the head 16 whereas relatively much space remains vacant in the embodiment of FIG. 2.

It can be appreciated from FIG. 5 that the shank 12 has been inserted into the receiving opening 40 while having been rotated clockwise about a small angle. At this point, the shoulders 32 are located at the underside of the support member 36 as can be recognized from FIG. 2 and the edge of the opening 40 is in engagement with the surface portions 34. As a result, because of the inclination and conicity of the surface portions 34, the shank 12 is increasingly drawn into the opening 40 so that the head 16 comes to bear on the support member 36 in an ideal case although the support member 36 is relatively thin. The bias produced deforms the outer portion 20 of the head 16, which is conical in a relaxed condition, in a radially outward direction so as to sealingly bear against the surface of the support member 36 that faces it.

The same effect is obtained also on a thicker support member 38 of FIG. 3 with the shank 12, however, being rotated about a markedly smaller angle in the opening 42 until the increased bias is achieved again between the head 16 and the support member 38.

The invention claimed is:

1. A grommet adapted to be inserted into an opening of a sheet member having opposite upper and lower surfaces, said grommet comprising:
    a shank extending in an axial direction of said grommet and having opposite upper and lower ends;
    at least a locking tab coupled to said shank between the upper and lower ends of said shank and radially flexible relative to said shank; and
    a head connected to the upper end of said shank and comprising a flange adapted to engage the upper surface of the sheet member when said shank and said locking tab are snapped into the opening;
    wherein said shank comprises
    a shoulder in a region adjacent the head, said shoulder being adapted to be placed below an edge of the opening when said shank is moved transversely to said axial direction after being snapped into the opening, thereby preventing withdrawal of said shank from said opening; and
    an outer surface section inclined relative to the axial direction and connecting said shoulder and the lower surface of said head, for engaging the edge of the opening and drawing said shank into the opening when said shank is moved transversely to said axial direction; and
    wherein, when said shank is seen in said axial direction, said shoulder is confined between an outer edge of said shank and a first boundary line intersecting said outer edge at first and second points, and said outer surface section is confined between said first boundary line and a second boundary line that intersects the outer edge of said shank at a third point, and a spacing between said first and second boundary lines decreases as the second boundary line extends from the third point toward the first point.

2. The grommet of claim 1, wherein
    said shank has a rectangular cross section taken perpendicular to said axial direction, and
    the shoulder is located in a corner portion of said rectangular cross section, longitudinally extends toward an adjacent corner portion of said rectangular cross section, and has a width that decreases along said longitudinal extent.

3. The grommet of claim 1, wherein said outer surface section extends continuously, exclusively radially inwardly and upwardly from said shoulder all the way to the lower surface of said head.

4. The grommet of claim 1, wherein said first and second boundary lines converge at said first point.

5. The grommet of claim 1, wherein said first and second boundary lines are straight lines.

6. The grommet of claim 5, wherein said first and second boundary lines converge toward each other and define therebetween an acute angle.

7. The grommet of claim 6, wherein said first boundary line and the outer edge of said shank define at said first point another acute angle.

8. A grommet adapted to be inserted into an opening of a sheet member having opposite upper and lower surfaces, said grommet comprising:
    a shank extending in an axial direction of said grommet and having opposite upper and lower ends;

at least a locking tab coupled to said shank between the upper and lower ends of said shank and radially flexible relative to said shank; and a head connected to the upper end of said shank and comprising a flange adapted to engage the upper surface of the sheet member when said shank and said locking tab are snapped into the opening;

wherein said shank comprises a shoulder in a region adjacent the head, said shoulder being adapted to be placed below an edge of the opening when said shank is moved transversely to said axial direction after being snapped into the opening, thereby preventing withdrawal of said shank from said opening; and an outer surface section inclined relative to the axial direction and connecting said shoulder and the lower surface of said head, for engaging the edge of the opening and drawing said shank into the opening when said shank is moved transversely to said axial direction; and wherein, when said shank is seen in said axial direction, said shoulder is confined between an outer edge of said shank and a first boundary line consisting of a straight line intersecting said outer edge at first and second points, and said outer surface section is confined between said first boundary line and a second boundary line;

the outer edge of said shank comprises first and second sections which are angled with respect to each other and intersect the first boundary line at said first and second points, respectively;

the second boundary line intersects the second section at a third point; and a spacing between said first and second boundary lines decreases as the second boundary line extends from the third point toward the first point.

9. The grommet of claim 8, wherein the outer surface section is planar, and the shoulder is planar and perpendicular to the axial direction.

10. The grommet of claim 8, wherein said locking tab has a lower end directly connected to said shank and an upper end which is free of any direct attachment with said shank and is connected to said shank exclusively via the lower end of said locking tab.

11. The grommet of claim 10, wherein the region of said shank with said shoulder is less radially flexible than said locking tab.

12. The grommet of claim 8, wherein said shank has an approximately rectangular cross section, taken perpendicular to said axial direction in the region adjacent to said head, and said shoulder and said outer surface section are located within and in a corner portion of the approximately rectangular cross section.

13. The grommet of claim 12, wherein said locking tab projects radially outwardly from a middle of a side of the approximately rectangular cross section.

14. The grommet of claim 12, wherein said shank comprises at least two said shoulders and two said outer surface sections being located in two diagonally opposite corner portions of said shank.

15. The grommet of claim 14, wherein each of said shoulders and outer surface sections has an approximately triangular shape having a side which is not parallel with any side of the approximately rectangular cross section of said shank and which is defined by at least one of said first and second boundary lines.

16. The grommet of claim 8, wherein said shank and said head together define an axial bore adapted to receive and retain therein an elongated fastening element.

17. The grommet of claim 8, comprising a plurality of said flexible locking tabs, wherein said shoulder is not part of any of said locking tabs.

18. The grommet of claim 8, wherein the outer edge of the shank further comprises a corner section located between and connecting said first and second sections; and the third point is farther from the corner section than the second point.

19. The grommet of claim 18, wherein said first and second sections are straight;

said second boundary line consists of a straight line;

said first section and said first and second boundary lines are slanted at acute angles relative to each other; and the corner section is curved.

20. In combination, a sheet member having opposite upper and lower surfaces and an opening connecting the upper and lower surfaces; and a grommet inserted into said opening, said grommet comprising:

a shank extending in an axial direction of said grommet and having opposite upper and lower ends;

at least a locking tab coupled to said shank between the upper and lower ends of said shank and radially flexible relative to said shank; and a head connected to the upper end of said shank and comprising a flange adapted to engage the upper surface of the sheet member when said shank and said locking tab are snapped into the opening;

wherein said shank comprises a shoulder in a region adjacent the head, said shoulder being adapted to be placed below an edge of the opening when said shank is moved transversely to said axial direction after being snapped into the opening, thereby preventing withdrawal of said shank from said opening; and an outer surface section inclined relative to the axial direction and connecting said shoulder and the lower surface of said head, for engaging the edge of the opening and drawing said shank into the opening when said shank is moved transversely to said axial direction; and wherein, when said shank is seen in said axial direction, said shoulder is confined between an outer edge of said shank and a first boundary line consisting of a straight line intersecting said outer edge at first and second points, and said outer surface section is confined between said first boundary line and a second boundary line;

the outer edge of said shank comprises first and second sections which are angled with respect to each other and intersect the first boundary line at said first and second points, respectively;

the second boundary line intersects the second section at a third point; and a spacing between said first and second boundary lines decreases as the second boundary line extends from the third point toward the first point.

* * * * *